Jan. 10, 1928.
L. KRUPP
1,656,070
BRAKE APPARATUS
Filed Nov. 19, 1926
2 Sheets-Sheet 1
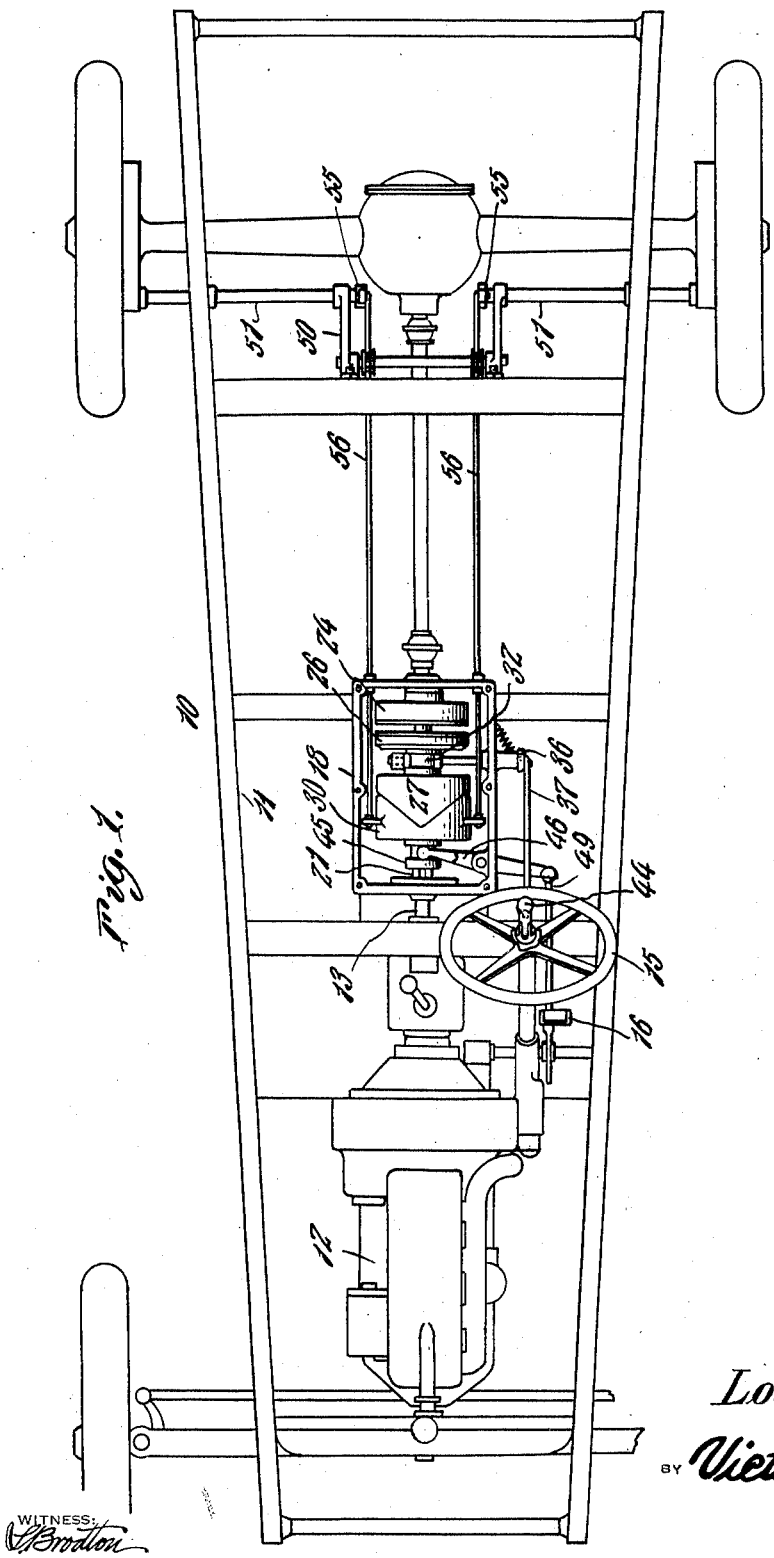
Louis Krupp
INVENTOR
BY Victor J. Evans
ATTORNEY Jan. 10, 1928.
L. KRUPP
1,656,070
BRAKE APPARATUS
Filed Nov. 19, 1926
2 Sheets-Sheet 2
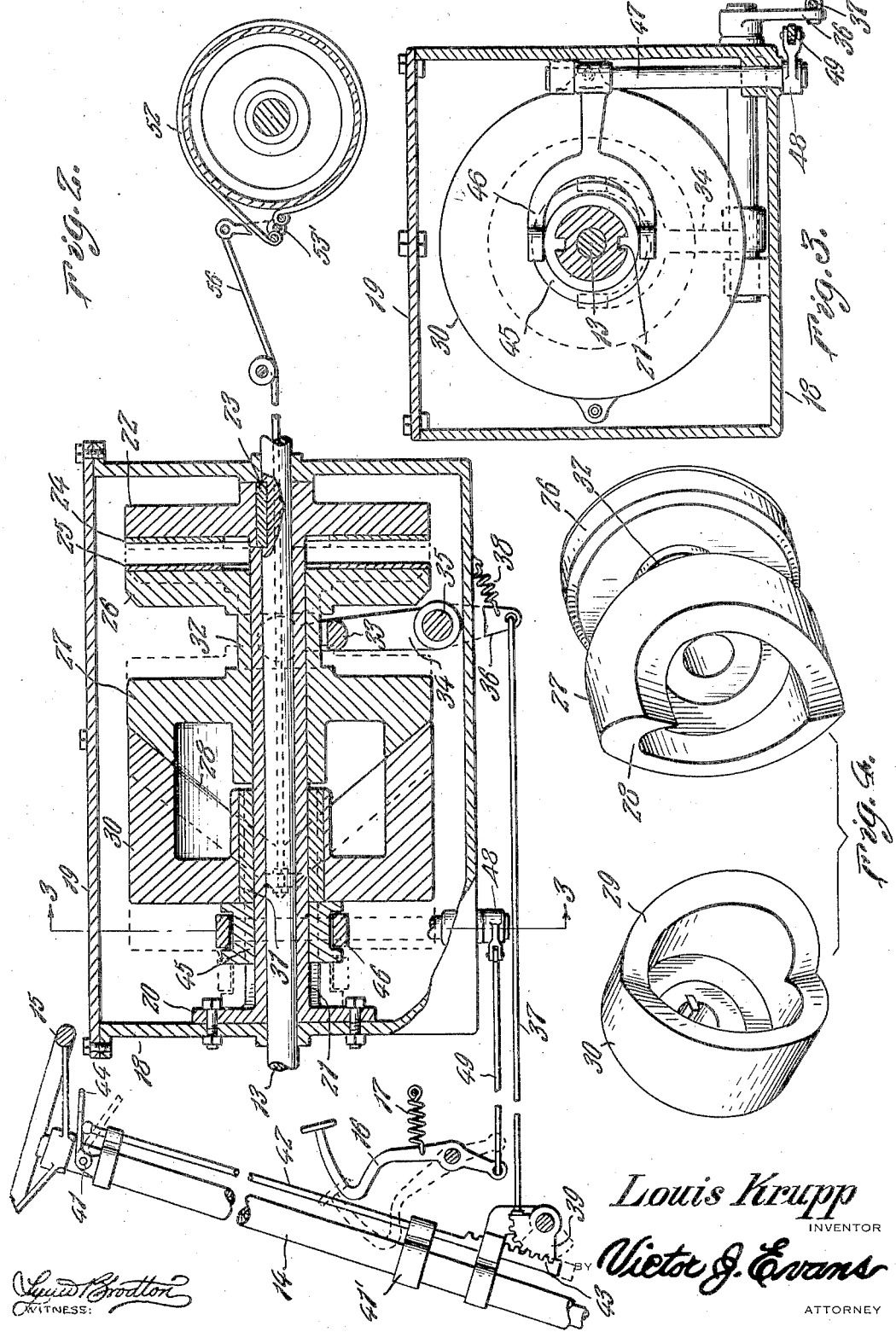
Louis Krupp
INVENTOR Patented Jan. 10, 1928.

1,656,070

UNITED STATES PATENT OFFICE.

LOUIS KRUPP, OF NEW YORK, N. Y.

BRAKE APPARATUS.

Application filed November 19, 1926. Serial No. 149,419.

This invention relates to improvements in brake apparatus and has particular reference to a power operated brake apparatus.

The primary object of the invention resides in a brake device operable by the driven shaft of a motor vehicle, which eliminates the use of the usual foot operated brake and the strain upon the operator of the vehicle when applying the brakes for bringing the vehicle to a gradual or sudden stop.

Another object of the invention is to provide a brake device which automatically disengages the clutch of the motor vehicle upon actuation of the same, but permits the actuation of the clutch independently of the brake device.

A further object of the invention is to provide a brake apparatus for motor vehicles which may be installed upon vehicles now in use without necessitating the radical changes in construction, easy to operate and efficient for the purpose intended.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a top plan view of the chassis of a motor vehicle with my improved brake device applied thereto, and with the cover of the housing removed.

Figure 2 is an enlarged vertical longitudinal sectional view.

Figure 3 is a vertical transverse sectional view on the line 3—3 of Figure 2.

Figure 4 is a detail perspective view of the coacting clutch elements in a separated position.

Referring more particularly to the drawings, the reference numeral 10 designates the chassis of a motor vehicle which includes a frame 11, a motor 12, a motor driven or drive shaft 13, a steering column 14, having a steering wheel 15 at the top end thereof, and the usual clutch pedal 16 normally held in clutching position by a spring 17.

My improved braking device includes a housing or casing 18 having a removable cover plate 19 bolted thereto and through which housing the drive shaft 13 extends. Fixedly mounted on one end of the housing by bolts 20 is a tubular sleeve 21 which encircles the drive shaft for a distance just short of the length of the housing for permitting a rotatable clutch disk 22 to be keyed to the shaft as at 23. The inner face of the disk is provided with a friction lining 24 for co-action with the friction face 25 of a coacting clutch disk 26 formed integral with a cam element 27 slidably mounted on the sleeve 21. The element 27 is provided with a conical shaped cam surface 28 for co-action with similar shaped surface 29 on a non-rotatable cam element 30. A reduced collar 32 is formed integral with the clutch disk 26 and the cam element 27 and receives the yoked end 33 of a lever 34 mounted within the housing on a rocker shaft 35, which shaft extends beyond one side wall of the housing to receive an arm 36 to which one end of a pull cable 37 is connected. The collar 32 is slidable with the clutch disk and cam element which are slidably mounted on the sleeve 21. A spring 38 has one of its ends connected to the arm 36 and its other end connected to the housing for causing the yoked lever to normally hold the clutch disk 26 out of engagement with the clutch disk 22 but holds the cam elements 27 and 30 in meeting engagement with each other. The other end of the pull cable is connected to a gear segment 39 mounted in a bracket 40 fixed to the steering column 14.

Mounted in brackets 41 on the steering column is a push rod 42 disposed parallel to the steering column and which has a rack 43 provided on the lower end thereof for meshing engagement with the gear segment 39. The upper end of the push rod terminates below the steering wheel 15 and is engaged by a manipulating lever 44 pivotally supported by the steering column and which lever rests upon the top of the push bar for depressing the bar upon the manual depression of the lever.

A sliding collar 45 is also mounted on the sleeve 21 between the cam element 30 and the inner end of the housing, and is engaged by a yoke 46 mounted on a vertical rocker shaft 47 journalled within the housing 18. The lower end of the rocker shaft extends through the bottom of the housing and to which end an arm 48 is connected. The arm 48 is operatively connected with the clutch pedal 16 by a connecting rod 49. The collar 45 normally abuts the cam element 30 and may be moved independently of the said element upon the depression of the clutch pedal 16 for shifting gears.

Mounted adjacent the rear of the chassis frame and journalled in brackets 50 are rocker shafts 51, which are disposed parallel to the axis of the rear axles of the vehicles and which have their outer ends connected to the ends of the brake bands 52 by means of a knuckle 53. The brake bands are of the usual construction and encircle the brake drums 54 of the rear wheel. The inner ends of the rocker shafts 51 are provided with levers 55 which when actuated, turn the rocker shafts 51 to contract the brake bands about the drums to set up a braking action on the rear wheels. The free ends of the levers 55 are connected by one of the ends of a pair of cables 56, the other ends of the cables being fixedly mounted to the sides of the cam element 30 as clearly shown in Figure 1 of the drawings, so that a forward movement of the element 30 will exert a pull upon the levers 55 to rock the shafts 51 and accordingly apply the brakes.

In operation, the operator of a motor vehicle when desiring to bring the vehicle to a gradual or sudden stop, presses upon the lever 44, which in turn pushes down upon the push rod 42, causing the rack 43 to actuate the gear segment 39. The gear segment being connected to the rocker shaft 35 through the cable 37 and arm 36, transfers the motion to the yoke 34 which moves the sliding clutch disk 26 into meeting engagement with the clutch disk 22. As the disk 26 moves into engagement with the disk 22, the sliding cam element 27 moves a corresponding distance away from the cam element 30. As the clutch disk 26 engages the disk 22, the disk 26 begins to turn due to the fact that the disk 22 is keyed to the drive shaft of the vehicle. The cam element 26 is turned a limited distance which causes the co-acting faces to jam, thereby forcing the cam element 30 forward or away from the cam element 27, and as the cam element 30 moves longitudinally, it will impart a pull to the cables 56, and in turn actuate the rocker shafts 51 to contract the brake bands about their respective drums. The cam element 27 can only turn a slight distance with respect to the cam element 30, thus halting rotation of the clutch disk 26. As the cam element 30 moves forward it pushes the collar 45 which is operatively connected with the clutch pedal 16, and moves the clutch pedal to the dotted position, at which position the clutch of the automobile is disengaged so that the car will come to an abrupt stop upon the depression of the manipulating lever 44. Upon release of the lever 44, the springs 38 and 17 serve to return the parts in their normal positions.

When it is desired to shift the gears of the motor vehicle, the clutch pedal 16 may be depressed without effecting the operation of the brakes, as the collar 45 will slide on the sleeve 21 independently of any of the other parts.

From the foregoing description, it will be seen that I have provided a brake apparatus for motor vehicles in which a great braking action is provided by a relatively small amount of effort on the part of an operator. The stopping and clutch disengagement of the vehicle is controlled by the actuation of a single lever and it will be appreciated that a braking device of this nature will be found useful on cars when driven in heavy traffic where numerous stops are made.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a motor vehicle having a rotatable drive shaft, brake drums, brake bands encircling said brake drums, and a clutch pedal, the combination with a means operable by said drive shaft for contracting said brake bands about said brake drums, control means for rendering said first means operative and inoperative, and automatic means for operating said clutch pedal to disengage the clutch of the motor vehicle upon the operation of said first means.

2. In combination with a rotatable drive shaft of a motor vehicle, a clutch disk fixed to said shaft, a second clutch disk slidably mounted with respect to said first disk and normally out of engagement therewith, manually operable means for sliding said second clutch disk into engagement with said first clutch disk to impart a slight turning movement thereto, said manually operable means including a rock lever connected with said second clutch disk, a gear segment, a flexible cable connecting said rock lever with said gear segment, and a push bar having a rack engaging said gear segment, and brake means operable upon the limit of sliding movement of said second clutch disk.

3. In combination with the rotatable drive shaft of a motor vehicle, a clutch disk fixed to said shaft, a second clutch disk slidably mounted with respect to said first disk and normally out of engagement therewith, manually operable means for sliding said second clutch disk into engagement to said first clutch disk to impart a slight turning movement thereto, and brake means operable upon the limit of sliding movement of said second clutch disk, a clutch pedal movable independently of said brake means, and automatic means for actuating said clutch pedal upon the actuation of said brake means.

4. In a power operated brake apparatus, the combination with a rotatable drive shaft of a motor vehicle, a housing through which said shaft extends, a clutch disk fixed to said shaft and disposed within said housing, a tubular sleeve fixed to said housing and encircling said shaft, a second clutch disk freely mounted on said sleeve and normally held out of engagement with said first clutch disk, a cam element movable with said second clutch disk, a second cam element slidably mounted on said tubular sleeve and normally engaging said first cam element and non-rotatable with respect to said first cam element, manipulative means for moving said second clutch disk into engagement with said first clutch disk for imparting a slight turning movement to said first cam element to cause the same to force said second cam element longitudinally in a direction away from said first cam element, brake devices, and means for operating said brake devices upon the longitudinal movement of said second cam element, a clutch pedal, and means operable by the longitudinal movement of said second cam element for depressing the same to cause the clutch of the motor vehicle to automatically disengage upon the operation of said brake devices.

In testimony whereof I have affixed my signature.

LOUIS KRUPP.